(12) United States Patent
Chen et al.

(10) Patent No.: US 6,225,787 B1
(45) Date of Patent: May 1, 2001

(54) TEMPERATURE STABILIZED CONSTANT CURRENT SOURCE SUITABLE FOR CHARGING A HIGHLY DISCHARGED BATTERY

(75) Inventors: Sean S. Chen, Sunnyvale; Robert Pease, San Francisco, both of CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/564,412

(22) Filed: May 2, 2000

(51) Int. Cl.[7] .................................................. H02J 7/04
(52) U.S. Cl. ............................................................ 320/150
(58) Field of Search .................................... 320/150, 152, 320/153, 158

(56) References Cited

U.S. PATENT DOCUMENTS 3,887,858 * 6/1975 Burkett et al. ........................ 320/158
4,061,956 * 12/1977 Brown et al. ......................... 320/153
5,633,574 * 5/1997 Sage ..................................... 320/152

* cited by examiner

*Primary Examiner*—Peter S. Wong
*Assistant Examiner*—Pia Tibbits
(74) *Attorney, Agent, or Firm*—Beyer Weaver & Thomas LLP (57) ABSTRACT

A temperature stabilized, constant current source of the present invention includes a feedback control stage that provides a substantially constant battery charging current at a particular temperature. A temperature stabilized current source stage includes a negative temperature coefficient current source that provides a countervailing control current to a positive temperature coefficient current source that is coupled from a sensing resistor. The temperature dependencies of the positive and negative temperature coefficient current sources tend to cancel each other out so as to provide a temperature stabilized current to the sensing resistor. In this way, a control voltage is developed across the control resistor that is independent of resistor temperature dependencies.

12 Claims, 7 Drawing Sheets

TEMPERATURE STABILIZED CONSTANT CURRENT SOURCE SUITABLE FOR CHARGING A HIGHLY DISCHARGED BATTERY

BACKGROUND OF THE INVENTION

This invention relates generally to analog integrated circuits, and more particularly to current sources implemented in analog integrated circuits.

Constant current sources and constant voltage sources are used for a variety of purposes in analog integrated circuits. As used herein, "constant" means that the output of the source remains at a relatively constant direct current (d.c.) level, although the output levels of such sources can typically be adjusted ("set") with a control signal. Once set, the output of a constant current or voltage source may change with temperature (i.e. be "temperature dependent") or may be stable with temperature. In many applications, it is desirable to have a constant current or voltage source that does not vary in output as the temperature changes. Such applications include power supplies that are suitable for charging batteries and the like. Unfortunately, however, conventional battery chargers are not capable of charging batteries that have been discharged below approximately 2.5 to 3.0 volts.

If the output of a constant, temperature stable, current source is coupled from an output resistor that is temperature stable, the result is a constant, temperature stable voltage source, as will be appreciated by those skilled in the art. These constant, temperature stable voltage sources are useful for many purposes, such as providing a reference voltage, for adjusting the threshold of a comparator, etc. that are useful power supplies for charging a battery Therefore, what is desired is a temperature stabilized, adjustable, yet constant current source suitably arranged to charge a battery that has been discharged to as low as 1.0 volts.

SUMMARY OF THE INVENTION

The invention is an electrical circuit that provides a temperature stabilized current source with a stable control voltage capable of charging a battery having been discharged to as low as approximately 1 volt. As used herein, "stable" means that the voltage remains essentially unchanged with changes in temperature, i.e. it is not temperature dependent. The circuit solves the problem of providing an adjustable temperature stabilized current source suitable for charging deeply discharged (i.e. in the range of 1.0 V) batteries.

A temperature stabilized, constant current source of the present invention includes a feedback control stage arranged to provide feedback control so as to maintain a battery charging current to within a predetermined range of current values. The current source also includes a temperature stabilized current source stage operative to produce an output current that is constant over a wide range of ambient temperatures. The current source stage includes a temperature-dependent input stage with positive temperature coefficient and a negative temperature coefficient controlled constant current source providing a countervailing control current such that the current through a sensing resistor is constant over a large temperature range. The temperature dependencies of the positive temperature coefficient voltage source and a negative temperature coefficient current source are combined so as to provide a control voltage that is independent of any resistor temperature dependency.

As a method for providing a temperature independent current suitable for charging a highly discharged battery, a battery charging current is maintained to the battery within a specified range of battery charging currents using a feedback control circuit. The feedback controlled battery charging current is further temperature stabilized over a range of operating temperatures by a temperature stabilized current source having positive temperature coefficient current source and a countervailing negative temperature coefficient current source that maintains a temperature stabilized current through a sensing resistor.

The method and apparatus of the present invention therefore solves the problem of providing a temperature independent (i.e., zero temperature coefficient, or tempco) current source whose output is a stable fraction of total current available, regardless of any changes in the total current due to changes in temperature.

These and other advantages of the present invention will become apparent to those skilled in the art upon a reading of the following descriptions of the invention and a study of the several figures of the drawing.

DETAILED DESCRIPTION OF THE PREFERRED EMBODIMENTS

Figure 1:
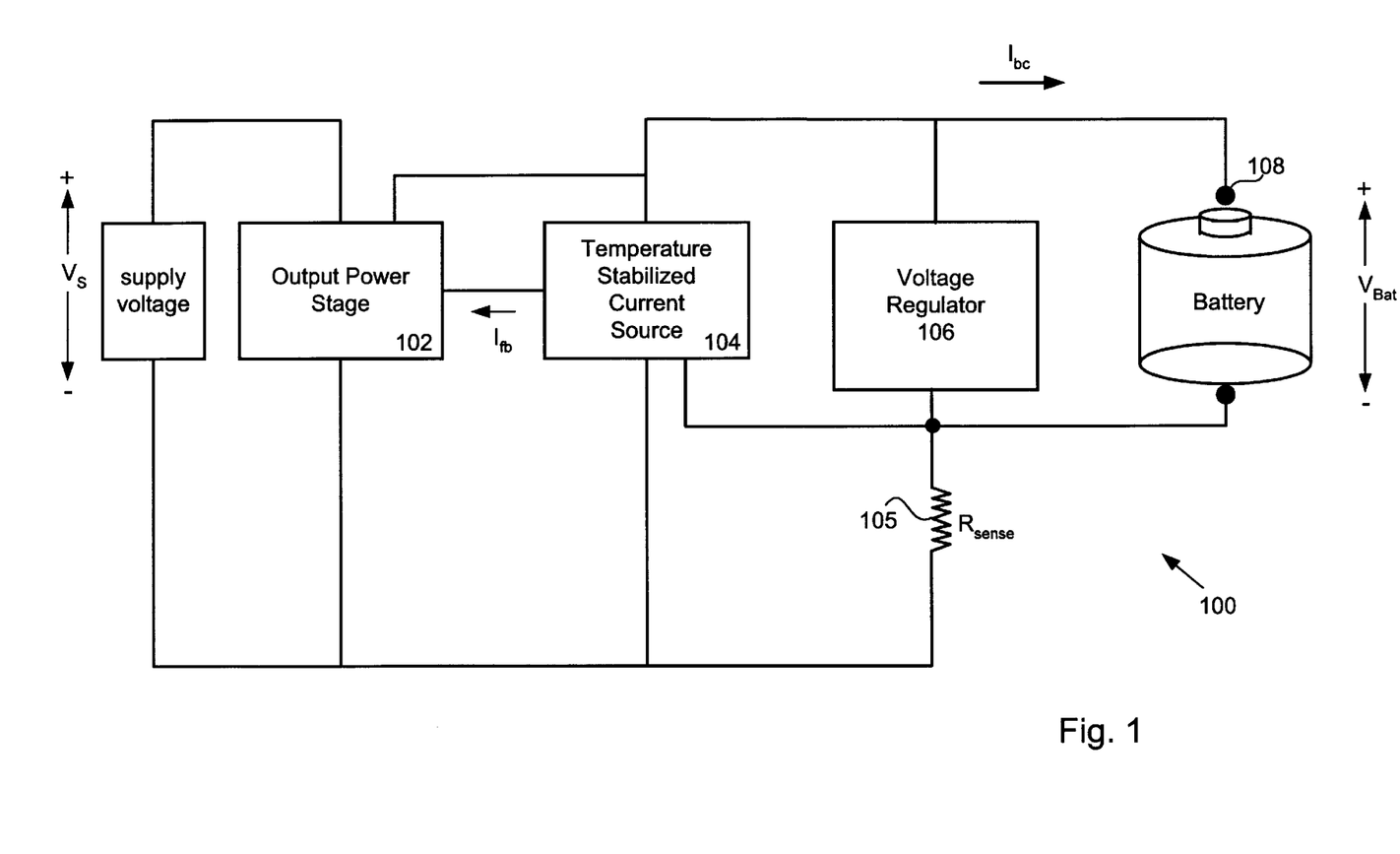
FIG. 1 is a block diagram of a temperature-stabilized, constant current source in accordance with the present invention.
Figure 2A:
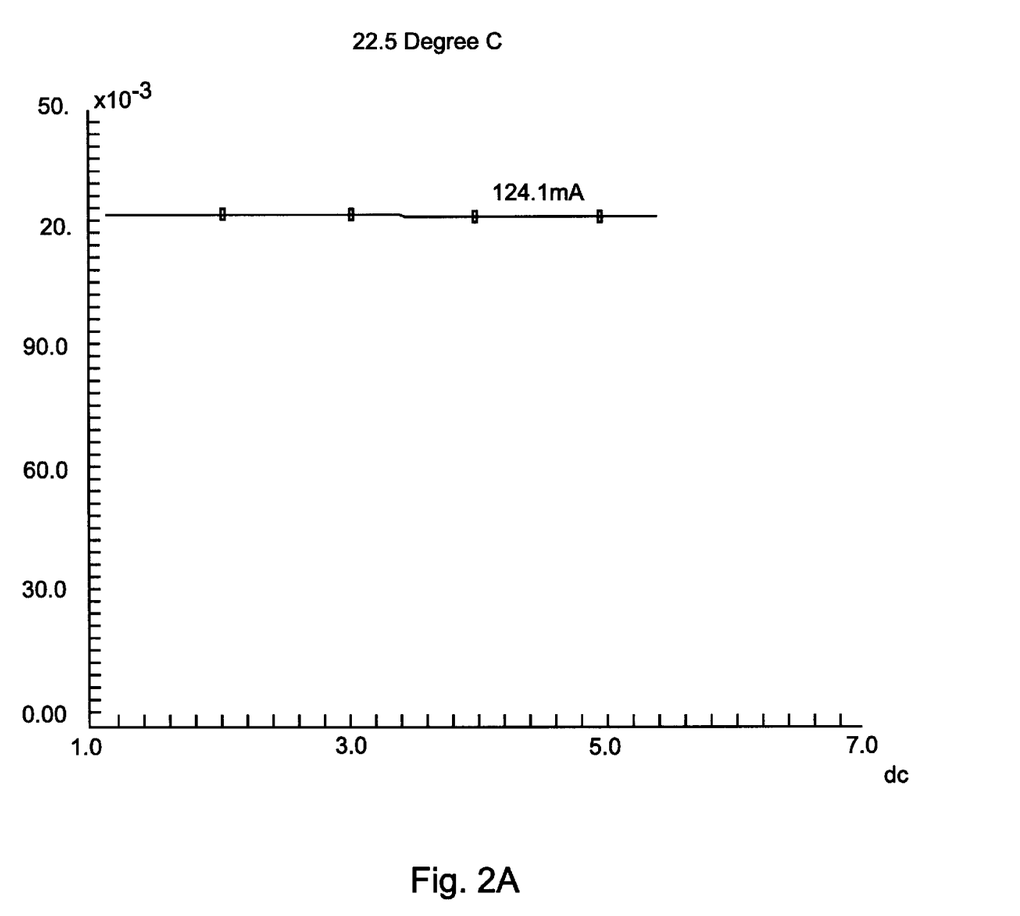
FIGS. 2A–2E is a graphical representation of the output current versus output voltage over a selected temperature range for a particular implementation of the invention.
Figure 2B:
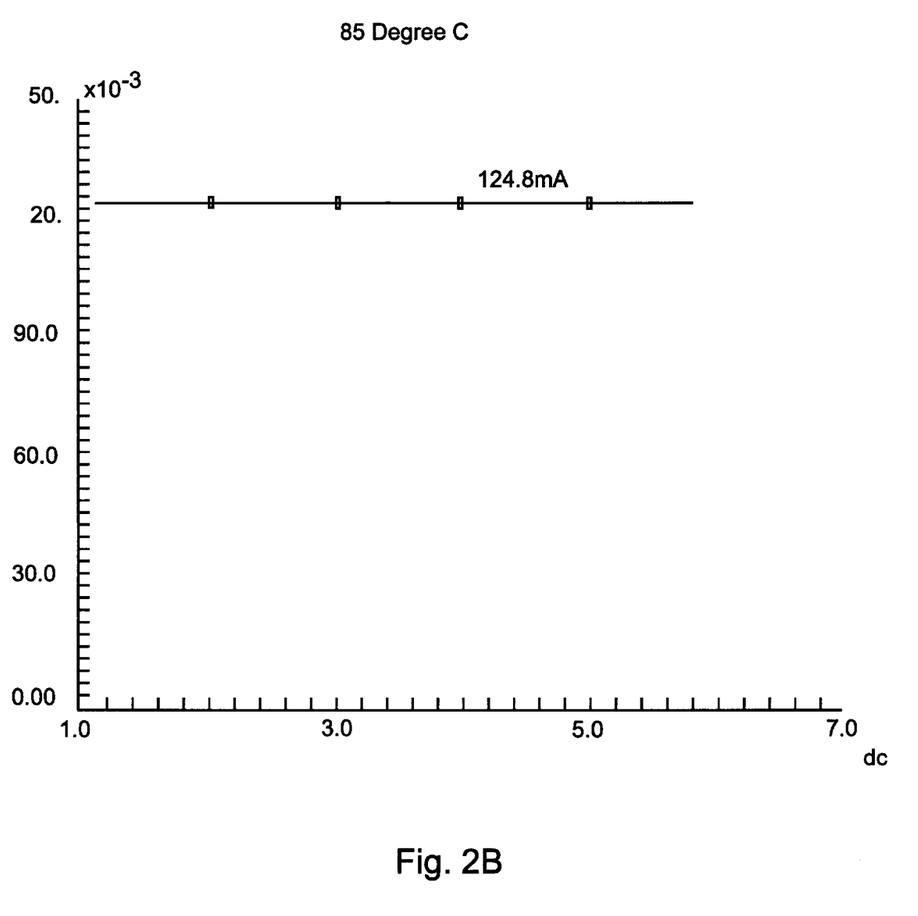
Figure 2C:
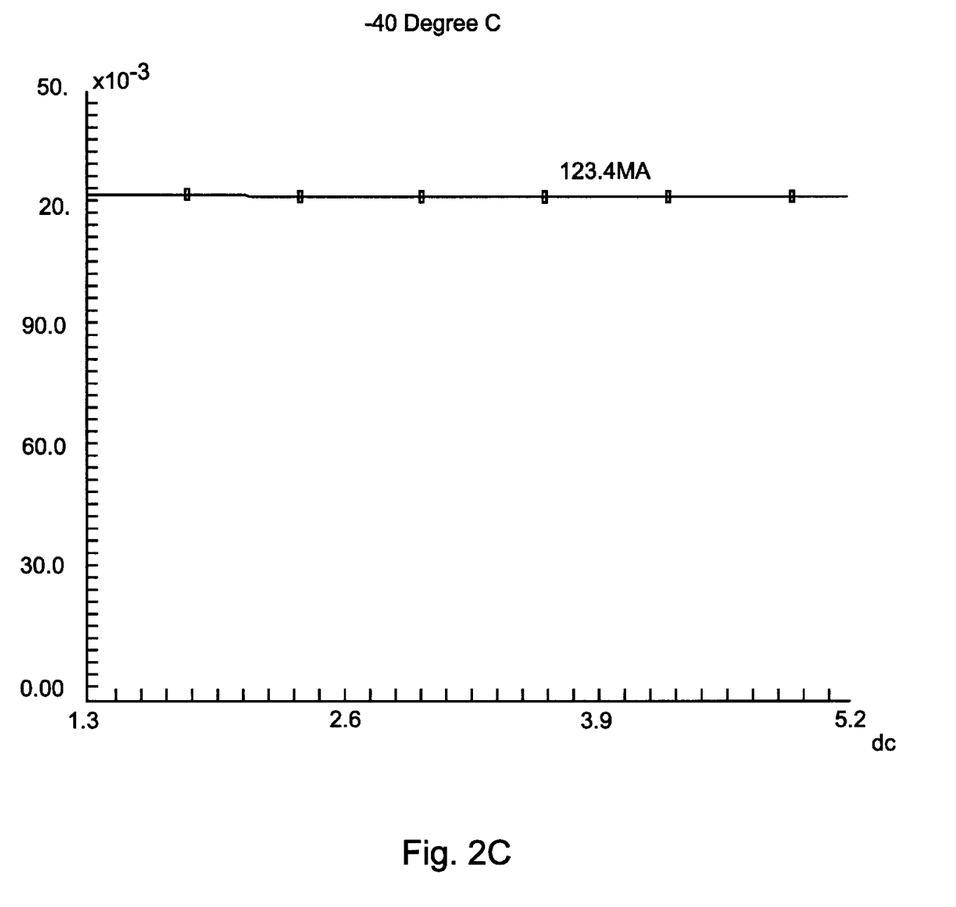
Figure 2D:
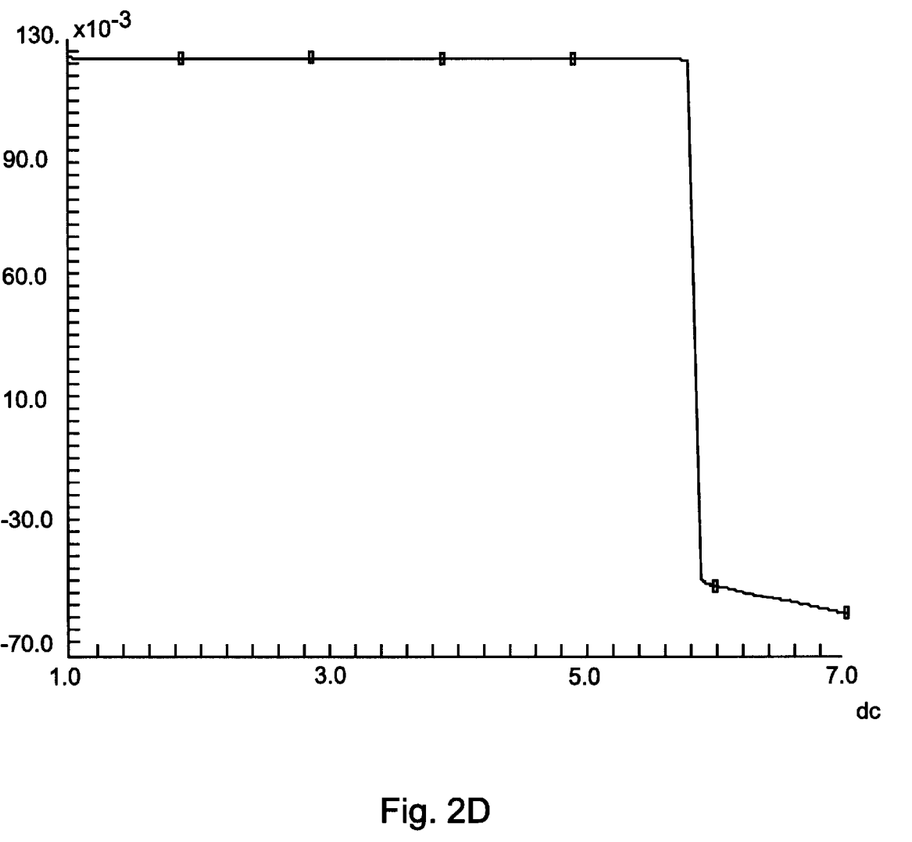
Figure 2E:
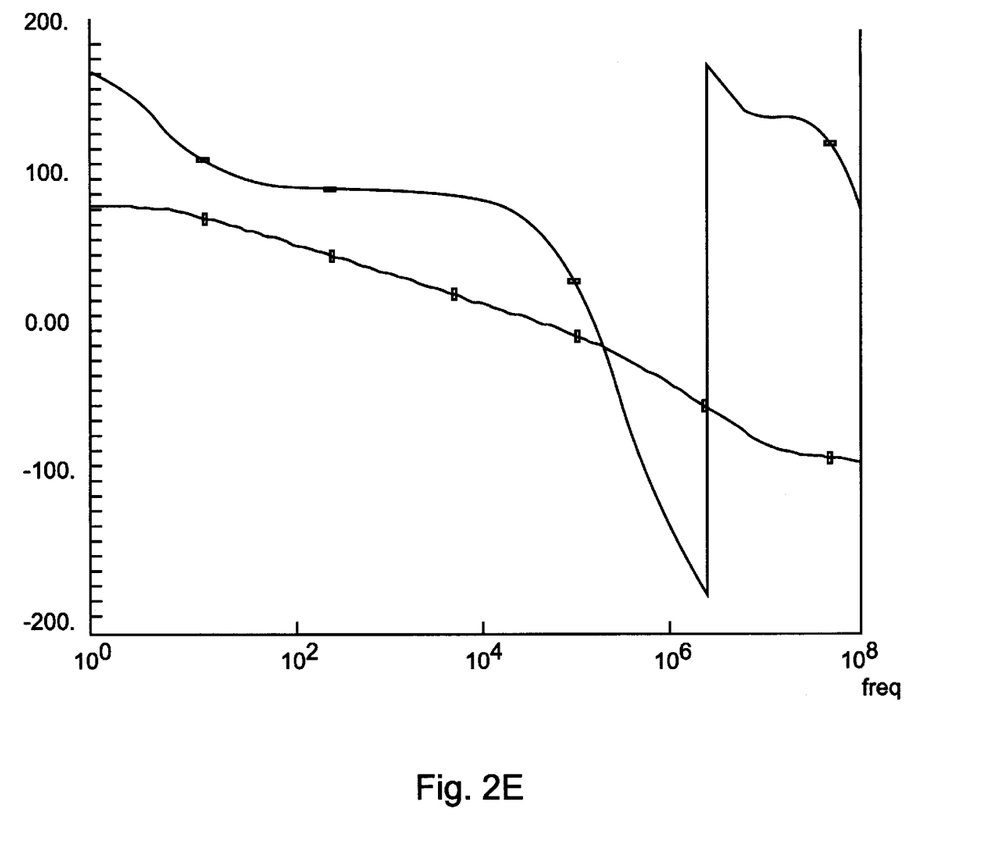

In FIG. 1, a temperature-stabilized, constant current source battery charger 100 in accordance with the present invention, includes a first stage 102 in the form of a feedback control circuit coupled from a second stage 104. In the described embodiment, the second stage 104 takes the form of a temperature stabilized current controlled source circuit that uses a voltage developed by a sensing resistor $R_{sense}$ 105 to compensate for any change (i.e., increase or decrease) in ambient temperature. In some embodiments, the second stage 104 is coupled from a third stage 106 that takes the form of a voltage regulator circuit 106 that is used to shut down the current source circuit 104 at a preselected battery voltage level. In the described embodiment, the voltage regulator circuit is coupled to a voltage divider formed of resistors $R_6$ and $R_7$.

In the described embodiment, at a particular ambient temperature, the output power stage 102 maintains a substantially constant battery charging current $I_{bc}$ by producing a feedback current signal in proportion to any deviation (i.e., an increase or a decrease in $I_{bc}$) of a nominal battery charging current $I_{bc}$ through a battery 108. During operation, the output power stage 102 provides the current necessary to maintain the battery charging current $I_{bc}$ at its nominal value.

In those situations where there is a change (either an increase or a decrease) in ambient temperature, the temperature stabilized current source circuit 104 maintains a substantially constant battery charging current $I_{bc}$ by, in a preferred embodiment, maintaining a constant voltage ($V_{sense}$) across the sensing resistor $R_{sense}$ 105. In this way, the temperature stabilized current source circuit 104 is able to maintain a constant battery charging current $I_{bc}$ over a wide range of ambient temperatures. In a preferred embodiment, the temperature stabilized current source circuit 104 utilizes a negative temperature coefficient current source (shown in FIG. 1) to compensate for any positive temperature coefficient current sources (shown in FIG. 3) in order to maintain a constant sensing current $I_s$ through the sensing resistor 105. In this way, the battery charging current $I_{bc}$ to the battery 108 is stable over any contemplated range of operating temperatures.

In the described embodiment, during operation of the battery charger circuit 100, the voltage regulator circuit 106 is set to shut down operation of the temperature stabilized current source circuit 104 by, in one embodiment, turning off current sources included in the temperature stabilized current source circuit 104 as well as diverting current from the battery 108 to ground. In this way, the battery charging circuit 100 provides a highly predictable and stable current source useful for charging batteries having been discharged to as low as 1.0 volt over a wide range of contemplated operating temperatures as illustrated in FIGS. 2A–2E.

Figure 3:
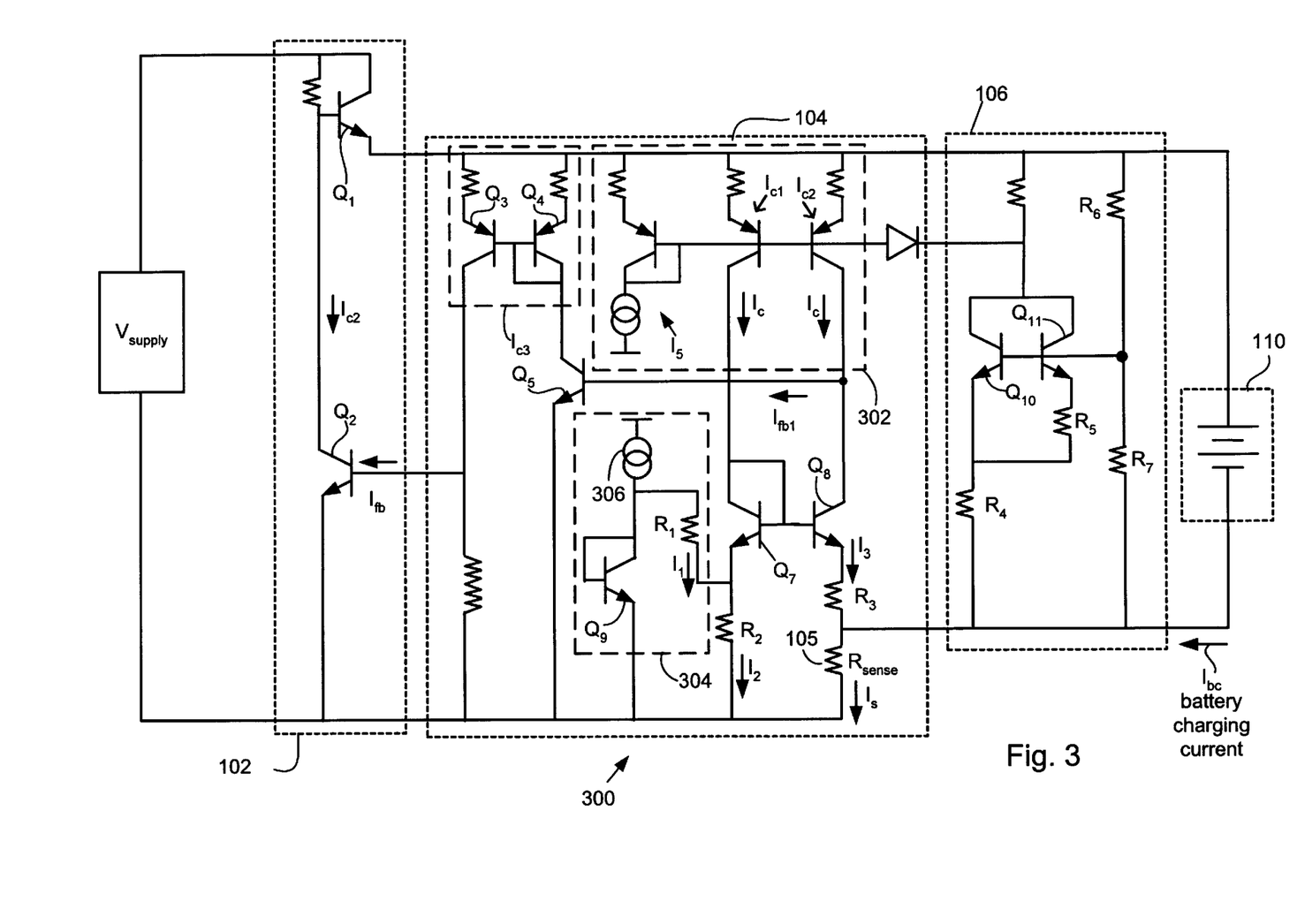
FIG. 3 is a circuit diagram of a temperature-stabilized, constant current source of the present invention that can be used in the circuit of FIG. 1.

FIG. 3 illustrates a circuit diagram 300 of one embodiment of the battery charging circuit 100 in accordance with an embodiment of the invention. As shown, the output power stage 102 includes transistors labeled $Q_1$ and $Q_2$. In this preferred embodiment, the transistors $Q_1$–$Q_2$ are bipolar NPN transistors. The design and fabrication of bipolar transistors that are commercially available is well known to those skilled in the art.

The temperature stabilized current source circuit 104 also includes a number of current sources. More particularly, the temperature stabilized current source circuit 104 includes a matched dual current source 302. The matched dual current source 302 includes a first current source $I_{c1}$, a second current source $I_{c2}$, and a biasing current source $I_5$. A gain stage $I_{c3}$ provides a feedback current $I_{fb}$ to the transistor $Q_2$ included in the output power stage 102. In addition, a capacitor $C_1$ having a capacitance of approximately 400 nf is coupled between the collector and base of the transistor $Q_2$. For example, at a particular operating temperature, if a nominal battery charging current $I_{bc(nominal)}$ increases by an amount $\Delta I_{bc}$, such that the battery charging current $I_{bc}$ is increased to ($I_{bc(nominal)}+\Delta I_{bc}$), a first feedback current $I_{fb1}$ also increases. The increase in feedback current $I_{fb}$ increases the base drive of an NPN transistor Q5 which increases the base drive of a PNP transistor $Q_3$. The increase in the base drive of the PNP transistor Q3 results in an increase in the base drive ($I_{fb2}$) of the NPN transistor $Q_2$ which results in an increase in the transistor $Q_2$ collector current $I_{c2}$ which pulls the collector of transistor Q2 and the base of the transistor $Q_1$ low. In the described embodiment, the increased collector current $I_{c2}$ has the effect of reducing the base drive of the NPN transistor $Q_1$. In a preferred embodiment, the decrease in the base drive of the transistor $Q_1$ causes the increased battery charging current ($I_{bc(nominal)}+\Delta I_{bc}$) to be reduced by $\Delta I_{bc}$ thereby returning the battery charging current $I_{bc}$ to its nominal value $I_{bc(nominal)}$. It should be noted that when the battery charging current $I_{bc}$ decreases, the feedback circuit 102 will increase the battery charging current $I_{bc}$ to its nominal value $I_{bc(nominal)}$. In a preferred embodiment, the emitter area of the transistor $Q_8$ is approximately 10 times that of the transistor $Q_7$ which gives a $\Delta V_{be}$ of approximately 60 mV. In this way, the active base emitter turnon voltage of the transistor $Q_8$ (i.e., $V_{be(Q8)}$) is approximately 600 mV whereas the active base emitter turnon voltage of the transistor $Q_7$ ($V_{be(Q7)}$) is approximately 660 mV.

As is well understood in the art, when the temperature of an NPN bipolar transistor increases, the $\Delta V_{be}$ of $Q_7$ and $Q_8$ will also increase. Therefore, as the temperature of the battery charging circuit 100 changes, the current through the sensing resistor $R_{sense}$ 105 will also change if it were not compensated with the present invention, resulting in a correspondingly undesireable change in the battery charging current $I_{bc}$.

With a zero temperature coefficient sensing resistor Rsense, the combined positive temperature coefficient exhibited by the $\Delta V_{be}$ of the transistors $Q_7$ and $Q_8$ is substantially compensated for by a negative temperature coefficient current source 304. In the described embodiment, the current source 304 includes a biasing circuit 306 (typically in the form of a IPTAT) coupled from a resistor R1 and a transistor $Q_9$ having its collector tied to its base to form a $V_{be}$ dependent diode. The emitters of the transistor $Q_7$ and $Q_8$ are coupled to both the resistor $R_1$ and the resistor $R_2$. In the described embodiment, the base of the transistor $Q_8$ is coupled to the base of the transistor $Q_7$ having its emitter coupled to a resistor R3 that is in turn coupled from the sensing resistor ($R_{sense}$) 105. It should be noted that the transistors $Q_7$ and $Q_8$ are preferably NPN transistors where the transistor $Q_8$ has a larger emitter area than the transistor $Q_7$. Typically, the ratio of the emitter areas of the transistors $Q_8$ to $Q_7$, is in the range of approximately 2.0 to approximately 16.0 (i.e., when the device size of the transistor $Q_8$ is twice the size of the transistor $Q_7$, the ratio is 2.0).

During operation, in order to maintain a temperature stabilized battery charging current $I_{bc}$, the sensing current $I_s$ through the sensing resistor 105 must remain substantially temperature stabilized. In this way, a constant battery charging current $I_{bc}$ is maintained through the battery 108 across any contemplated range of operating temperatures.

The operation of the constant current source circuit 104 of the present invention will now be discussed in greater detail. As shown, the current source 304 provides a current $i_1$ through the resistor $R_1$.

The equations for the currents in transistors are:

$$(i_2+i_1)* R_2+V_{be(Q7)}-V_{be(Q8)}-i_3*R_3-(I_S+i_3)R_S=0 \quad \text{(Equation 1)}$$

by setting $$R_2=R_3 \quad \text{(Equation 2)}$$

and $$i_2=i_3 \text{ and assuming } i_3<<I_S, \text{ and } I_{bQ7}<<I_e \quad \text{(Equation 3)}$$

Then:

$$\Delta V_{sense}=[V_{be(Q7)}-V_{be(Q8)}]+i_1*R_2 \text{ or,} \quad \text{(Equation 4)}$$

$$\Delta V_{sense}=\Delta V_{be}+i_1*R_2 \quad \text{(Equation 5)}$$

Since $i_1$ (delivered by the current source 304) is set by resistors $R_1$ and $R_2$, then by selecting appropriate resistor values $R_1$ and $R_2$ such that $$i_1*R_2 \text{ is approximately equal to } \Delta V_{be} \quad \text{(Equation 6)}$$

or more precisely . . .

$$\text{T.C. of } (i_1 * R_2) = -\text{T.C. of}(\Delta V_{be}) \quad \text{(Equation 7)}$$

then $V_{sense}$ has zero temperature coefficient. In this way, for example, when $\Delta V_{be}$ increases by 10 millivolts, for example, then $i_1 * R_2$ will decrease by 10 millivolts thereby maintaining a constant current Is through the sensing resistor $R_{sense}$ 105.

It should be noted, that in some embodiments, a voltage regulator circuit 106 well known to those skilled in the art is used to provide a cutoff voltage above which the battery 108 is no longer being provided the battery charging current $I_{bc}$.

The actual value for the various components in battery charging circuit 100 are dependent upon the application of the circuit, as will be appreciated by those skilled in the art. Typically, $V_{supply}$ is in the range of approximately 7.0 to 10.0 volts and the current sources $I_{c1}$ and $I_{c2}$ can be, for example, 10 or 100 microampere current sources, whereas the sensing resistor 105 can be, for example, approximately 1 ohm.

It should be noted that it is contemplated that $R_{sense}$ is an ideal zero temperature coefficient type resistor. However, if the sense resistor $R_{sense}$ has a positive or negative temperature coefficient, it can be compensated by changing the ratio of resistors $R_1/R_2$. For the proper operation of the present invention, the matched dual current sources $I_{c1}$ and $I_{c2}$ rely on good matching in ratio of resistors $R_1$ and $R_2$. As will be appreciated to those skilled in the art, there are many types of resistor technologies (also referred to herein as resistor "types") that can be provided on an integrated circuit. For example, in the book Analysis and Design of Analog Integrated Circuits, 2nd edition, P. Grey et al., John Wiley & Sons, © 1977, 1978, a number of resistor technologies are described including, for example, base-diffused, emitter-diffused, pinched, epitaxial, pinched epitaxial, and thin film resistors. It is not important to the present invention which resistor technology is chosen as long as they have good matching.

The circuit and method of the present invention can, and typically do, form a part of a larger system and/or process. For example, the circuit of the present invention typically forms a part of a larger circuit that is integrated on a "chip" and packaged. The packaged integrated circuit is then made a part of a larger system by attaching it to a printed circuit (PC) board along with other electronic devices, connecting the resultant circuit to power supplies and to other devices and systems. It should therefore be understood for the product that results from the processes of the present invention include the circuit itself, integrated circuit chips including one or more circuits, larger systems (e.g. PC board level systems), products which include such larger systems, etc. It should also be noted that transistors $Q_1$ and $Q_2$ can be located off-chip for a particular application.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A temperature stabilized, constant current source battery charger suitable for charging a substantially discharged battery, comprising:

a current based feedback control circuit responsive to small signal changes in a battery charging current wherein the feedback control circuit maintains the battery charging current within a predetermined range of current values at a particular operating temperature; and a temperature compensation circuit coupled from the feedback control circuit that is responsive to a temperature change having a sensing resistor of a given resistor technology coupled from at least one positive temperature coefficient voltage source and at least one negative temperature coefficient current source arranged to provide said sensing resistor with a temperature stabilized control current such that temperature dependencies of the negative temperature coefficient current source countervails the at least one positive temperature coefficient voltage source such that a sense voltage developed by the sensing resistor is constant over a predetermined operating range of temperatures.

2. A temperature stabilized, constant current source battery charger as recited in claim 1, further comprising:

an output power stage responsive to said sense voltage coupled from the feedback control circuit and the temperature compensation circuit.

3. A temperature stabilized, constant current source battery charger as recited in claim 1 wherein the positive temperature coefficient current source includes a first transistor having a first transistor base terminal coupled to a second transistor base terminal of a second transistor, wherein the first transistor and the second transistor each have different base-emitter turn-on voltages from the other, and wherein an emitter node of the second transistor is coupled to the sensing resistor.

4. A temperature stabilized, constant current source battery charger as recited in claim 3 wherein the negative temperature coefficient circuit includes a negative temperature current source coupled to an emitter terminal of the first transistor.

5. A temperature stabilized, constant current source battery charger as recited in claim 4 wherein the negative temperature current source substantially compensates for a temperature dependent current change generated by the positive temperature coefficient voltage source.

6. A temperature stabilized, constant current source battery charger as recited in claim 5 wherein the sensing current through the sensing resistor is stable over the predetermined operating range of temperatures.

7. A temperature stabilized, constant current source battery charger as recited in claim 6, wherein the feedback control circuit includes a feedback control sensing transistor coupled from the second transistor.

8. A temperature stabilized, constant current source battery charger as recited in claim 7 wherein feedback control sensing transistor responds to a change in the battery charging current.

9. A temperature stabilized, constant current source battery charger as recited in claim 8, wherein the discharged battery has an output voltage of approximately 1.0 volts.

10. A method for supplying a temperature independent battery charging current that is used to charge a substantially discharged battery having a battery output voltage, comprising:

supplying a charging voltage or a charging current at the battery;

stabilizing a sensing current through a sensing resistor at a particular temperature using a feedback control circuit;

developing a temperature stabilized control current at the sensing resistor;

applying said temperature stabilized current to said sensing resistor; and developing a control voltage across the sensing resistor based upon said temperature stabilized control current that is essentially independent of temperature dependencies of said control resistor such that the temperature independent battery charging current is supplied to the substantially discharged battery.

11. A method as recited in claim 10, further comprising:

supplying a substantially countervailing control current to a positive temperature coefficient current by a negative temperature coefficient current source such that the countervailing control current compensates for a temperature induced current change by the positive temperature coefficient current source over a range of operating temperatures.

12. A method as recited in claim 10, further comprising:

applying said output voltage to a voltage divider coupled from the battery, said voltage divider providing a reference voltage to a voltage regulator used to shut down the constant current source at a pre-determined value.

* * * * *